(12) United States Patent
Huerta

(10) Patent No.: US 11,401,959 B2
(45) Date of Patent: Aug. 2, 2022

(54) FLOW STRAIGHTENER INCLUDING VANES WITH TAPERED TAILS DESIGN AND INSTALLATION

(71) Applicant: McCrometer, Inc., Hemet, CA (US)

(72) Inventor: Rafael Huerta, Riverside, CA (US)

(73) Assignee: McCrometer, Inc., Hemet, CA (US)

( * ) Notice: Subject to any disclaimer, the term of this patent is extended or adjusted under 35 U.S.C. 154(b) by 412 days.

(21) Appl. No.: 16/449,028

(22) Filed: Jun. 21, 2019

(65) Prior Publication Data

US 2020/0400169 A1    Dec. 24, 2020

(51) Int. Cl.
*F15D 1/00* (2006.01)
*G01F 15/00* (2006.01)
*F15D 1/02* (2006.01)

(52) U.S. Cl.
CPC .............. *F15D 1/0005* (2013.01); *F15D 1/02* (2013.01); *G01F 15/00* (2013.01)

(58) Field of Classification Search
CPC .......... G01F 15/00; F15D 1/0005; F15D 1/02; F15D 1/025; F15D 1/001
See application file for complete search history.

(56) References Cited

U.S. PATENT DOCUMENTS

| | | | | |
|---|---|---|---|---|
| 2004/0055570 | A1* | 3/2004 | Bielicki | F15D 1/04 123/402 |
| 2010/0224275 | A1* | 9/2010 | Pinkerton | G01F 15/00 138/39 |

FOREIGN PATENT DOCUMENTS

| | | |
|---|---|---|
| DE | 102014113406 A1 | 3/2016 |
| EP | 1876427 A | 1/2008 |
| WO | 2008143834 A1 | 11/2008 |

OTHER PUBLICATIONS

International Searching Authority, Notification of Transmittal of the International Search Report and the Written Opinion of the International Searching Authority, or the Declaration, dated Oct. 2, 2020, p. 15.

* cited by examiner

*Primary Examiner* — Eric S. McCall
*Assistant Examiner* — Timothy P Graves
(74) *Attorney, Agent, or Firm* — Ference & Associates LLC

(57) ABSTRACT

An embodiment provides A flow straightener, comprising; a conical-shaped portion having a first end and a second end substantially opposite the first end, wherein the first end has a bigger diameter than the second end; and a plurality of liquid directing vanes extending from the conical-shaped portion, wherein each of the plurality of liquid directing vanes are located at a different location on the conical-shaped portion and are oriented parallel to a longitudinal center axis of the conical-shaped portion; and wherein the plurality of liquid directing vanes extend from the conical-shaped portion such that the plurality of liquid directing vanes are located on either an upper half with respect to a horizontal centerline of an end the conical-shaped portion or a lower half with respect to the horizontal centerline of the conical-shaped portion; wherein each of the plurality of liquid directing vanes are shaped having a tapered tail located after the first end of the conical-shaped portion. Other aspects are described and claimed.

18 Claims, 7 Drawing Sheets

FLOW STRAIGHTENER INCLUDING VANES WITH TAPERED TAILS DESIGN AND INSTALLATION

FIELD

This application relates generally to an apparatus used for straightening liquid flow within a fluid conveyance device.

BACKGROUND

Liquid traveling through a fluid conveyance device (e.g., a pipe) may swirl as it moves through the device. This swirling may cause issues when trying to gather information related to the liquid flowing through a pipe. For example, a device such as a flow meter may require that the liquid flowing through a pipe, and then the flow meter, arrives as a straight run rather than swirling. Liquid traveling through a flow meter in a straight run allows a device to produce much more accurate information.

The implementation of a flow straightener ("straightener") into a fluid conveyance device may assist in straightening out the liquid flow. A flow straightener may be installed and located in a position prior to a flow meter to provide a straight run of the liquid through the flow meter. Further, the installation of the flow straightener may be used to reduce turbulent flow. The lack of a flow straightener in a fluid conveyance device may lead to inaccurate flow meter readings, as well as may damage any additional devices installed within a fluid conveyance device that may not be able to withstand a swirling or highly turbulent flow.

Installation of a flow straightener into a fluid conveyance device may result in damage to the fluid conveyance device, or may damage the flow straightener. Therefore, proper installation of a flow straightener into a system is vital when trying to reduce liquid swirl and turbulence, as well as produce accurate information when utilizing a flow meter within a fluid conveyance device. Thus, a flow straightener must be implemented in a way to avoid damage to a system and assist in straightening the flow and altering turbulence caused by the liquid flowing through a fluid conveyance device.

BRIEF SUMMARY

In summary, one embodiment provides a flow straightener comprising: a conical-shaped portion having a first end and a second end substantially opposite the first end, wherein the first end has a bigger diameter than the second end; and a plurality of liquid directing vanes extend from the conical-shaped portion, wherein each of the plurality of liquid directing vanes are located at a different location on the conical-shaped portion and are oriented parallel to a longitudinal center axis of the conical-shaped portion; and wherein the plurality of liquid directing vanes extend from the conical-shaped portion such that the plurality of liquid directing vanes are located on either an upper half with respect to a horizontal centerline of an end the conical-shaped portion or a lower half with respect to the horizontal centerline of the conical-shaped portion; wherein each of the plurality of liquid directing vanes are shaped having a tapered tail located after the first end of the conical-shaped portion.

Another embodiment provides a flow straightener system, comprising: a fluid conveyance device; a flow meter installed in the fluid conveyance device through an opening in the fluid conveyance device; a conical-shaped portion of the flow straightener located within the fluid conveyance device; the conical-shaped portion having a first end and a second end substantially opposite the first end, wherein the first end has a bigger diameter than the second end; a plurality of liquid directing vanes extending from the conical-shaped portion, wherein each of the plurality of liquid directing vanes are located at a different location on the conical-shaped portion and are orientated parallel to a longitudinal center axis of the conical-shaped portion; wherein the plurality of liquid directing vanes extend from the conical-shaped portion such that the plurality of liquid directing vanes are located on either an upper half with respect to a horizontal centerline of an end the conical-shaped portion or a lower half with respect to the horizontal centerline of the conical-shaped portion; and wherein each of the plurality of liquid directing vanes are shaped having a tapered tail located after the first end of the conical-shaped portion.

An further embodiment provides a method for installing a flow straightener into a fluid conveyance device, comprising: removing a portion of a fluid conveyance device to create an opening, wherein the portion is located on the upper half of the fluid conveyance device, wherein the portion of the fluid conveyance device is smaller than the footprint of the flow straightener; inserting at an angle and at a same time, through the opening of the fluid conveyance device, one or more lower half vanes extending from the conical-shaped portion of the flow straightener; aligning a center of the conical-shaped portion of the flow straightener with an edge of the opening in the fluid conveyance device, moving the center of the conical-shaped portion of the flow straightener close to the edge of the opening of the fluid conveyance device, wherein the center of the conical-shaped portion moved close to the edge of the opening comprises a fulcrum; rotating downward, at the fulcrum, the flow straightener comprising one or more leading tapered edges, wherein the one or more leading tapered edges provide clearance of the flow straightener from an opposite edge of the opening of the fluid conveyance device, wherein the opposite edge of the fluid conveyance device is away from the fulcrum of the flow straightener; inserting at an angle and at the same time, through the opening of the fluid conveyance device, one or more upper half vanes extended from the conical-shaped portion of the flow straightener; rotating, as the one or more upper half vanes are inserted into fluid conveyance device, the flow straightener comprising one or more flat trailing edges, wherein the one or more flat trailing edges touch the inside of the fluid conveyance device, wherein the one or more flat trailing edges act as anchors along the inside of the fluid conveyance device; adjusting the flow straightener inserted into the fluid conveyance device, wherein the adjusting comprises at least one upper half vane and at least one lower half vane are substantially vertical, wherein the adjusting comprises pulling the flow straightener forward within the fluid conveyance device to allow proper installation of a cover; and installing a cover over the opening in the fluid conveyance device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
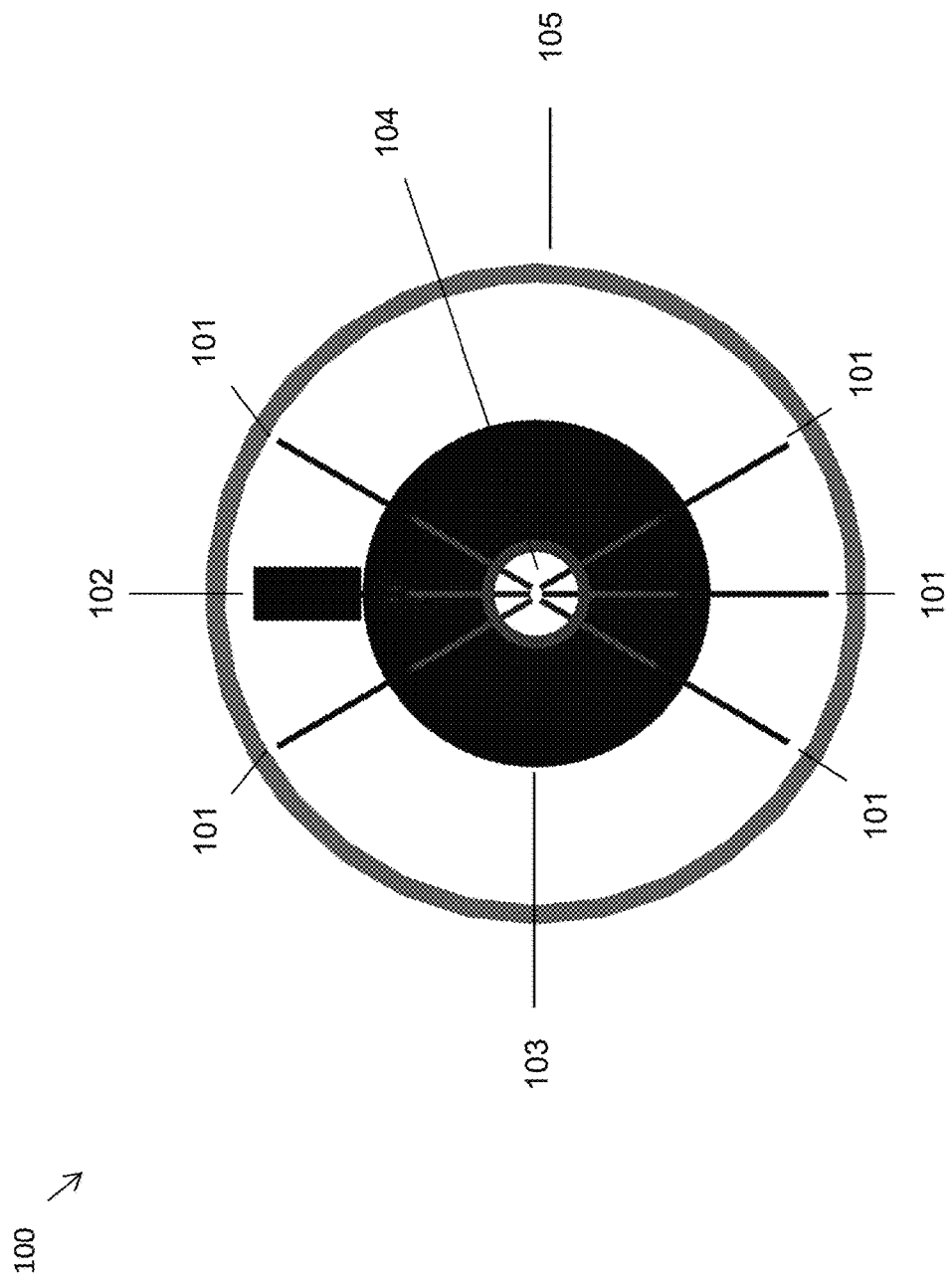
FIG. 1 illustrates an example head-on view of a flow straightener installed in a pipe.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventional methods for the installation of a flow straightener into a fluid conveyance device requires the fluid conveyance device to be completely cut open, open a flanged connection, or cut a large opening on the top of a fluid conveyance device. As one can assume, completely cutting a pipe open to install a flow straightener can be time consuming and expensive. The process of cutting the pipe, installing a secure flow straightener, and then coupling (e.g., welding) a separate piece of pipe to the cut of the original pipe is a consuming process. Additionally or alternatively, utilizing a flanged connection similarly requires the complete separation of a pipe, installation of the flow straightener, and then reconnection of a separate pipe. A flanged connection utilizes welding or the use of screws to connect the separate pipes, as well as uses O-rings and/or other materials to assure a seal is present at the connection in the pipes. This use of additional materials to provide a seal may cause a system to require regular maintenance. For example, if the liquid traveling through a fluid conveyance device, that has been coupled using a flange connection and an O-ring to secure the seal, is corrosive to rubber materials, the O-ring in place may need to be serviced/replaced regularly. Additionally, for example, if a material is used to create a seal at the flanged connection (e.g., Loctite®), the liquid flowing through the fluid conveyance device may have a reaction with such a substance; thus, causing the seal to deteriorate or affect the chemical makeup of the liquid that is flowing through a system.

Additionally, cutting a large opening on the top of the fluid conveyance device may damage a system. For example, the opening on the top of a pipe must be the size of the projected footprint of the flow straightener. Cutting a large opening into the top of a pipe may compromise the pipes structural integrity, as well as may provide a larger area for a weak seal to be present when the opening is covered.

Conventional flow straighteners comprise a conical-shape portion with symmetrical vanes operatively coupled throughout. Each of the vanes present in a flow straightener contains a rectangular shape that cause a flow straightener to be installed either horizontally into a fluid conveyance device, or vertically through an opening at least the width of the flow straightener, as mentioned previously. These installation techniques require an excessive amount of time, multiple materials, and an installer must be highly skilled to complete a task or may risk damaging a system.

Accordingly, an embodiment provides a system and a method for easy installing a flow straightener into a fluid conveyance device without damaging the system. The flow straightener may comprise a shape that permits easy installation into a fluid conveyance device, as well as decreasing the size of the opening required for installation. In an embodiment, the flow straightener may comprise a plurality of tapered vanes that are operatively coupled to or extending from a conical-shaped center portion, each vane being orientated parallel to a longitudinal center axis of the conical center portion. A symmetrical amount of vanes may be operatively coupled to or extending from the conical-shaped portion along the upper half of the conical-shaped portion and the lower half of the conical-shaped portion, with respect to a horizontal centerline of the conical-shaped portion. In an embodiment, the vanes located in each upper half and lower half of the flow straightener may be located equidistant from one other. In other words, the distance and angle between each vane located in either the upper half or the lower half of the flow straightener may be consistent.

The conical-shaped portion of the flow straightener may comprise openings on each end to permit the passing of a liquid through the conical-shaped portion. In an embodiment, the plurality of vanes operatively coupled to or extending from the conical-shaped portion may contain a leading tapered edge, along with a flat trailing edge, which may permit maneuvering of the flow straightener into a fluid conveyance device, allowing the installation of the flow straightener to occur through an opening smaller than that of the footprint of the straightener. Thus, decreasing the amount of possible damage that may be caused to a fluid conveyance device and flow straightener during the installation process. As well as, providing a simple method for installing a flow straightener.

The illustrated example embodiments will be best understood by reference to the figures. The following description is intended only by way of example, and simply illustrates certain example embodiments.

Referring to FIG. 1, an example system for an installed flow straightener 100 is presented. In FIGS. 1, 101 and 102 represent the vanes operatively coupled to the conical-shaped portion 103. In an embodiment, the vanes may extend from the cone-shaped portion. In an embodiment, the vanes may extend radially outward from the conical-shaped portion. In an embodiment, the system 100 may include vanes 101 and 102. The vanes 101 and 102 may be operatively coupled to or extend from the conical-shaped portion 103 and positioned in such a way that the vanes 101 do not extend past the edge of the conical-shape portion 103. In other words, if a vertical line was drawn from the perimeter of conical-shaped portion 103, along the left and right sides, the vanes 101 may extend out to the vertical line corresponding with the perimeter of the conical-shaped portion 103. In an embodiment, extending the vanes out to their maximum distance, in line with the perimeter of the conical portion 103, may provide system 100 with a flow straightener's maximum size, as well as maximum efficiency for straightening liquid flow and decreasing turbulence. By extending the vanes 101 to a maximum distance equal to that of the perimeter of the conical-shaped portion 103, the conical shaped portion 103 may be a minimum necessary size. A minimal size of the conical-shaped portion 103 of the system 100 is ideal for straightening out a liquid flow, and may assist in producing a maximum efficiency for a flow straightener.

The size of the flow straightener ultimately depends on the size of the fluid conveyance device 105 the straightener is being inserted into. For example, the flow straightener used in a 10" pipe may be smaller, and comprise a smaller conical-shaped portion 103, than a flow straightener installed into a 12" pipe. The vanes 101 and 102 may touch the inside walls of the fluid conveyance device 105. This anchoring of the vanes 101 and 102 to the walls of the fluid conveyance device 105 may assist in stabilizing the flow straightener when implemented into a system. These anchored vanes 101 and 102 may also direct the majority of liquid flowing through the fluid conveyance device 105 through the flow straightener, and then through the back, or smaller opening 104 of the conical-shaped portion 103; thus, producing a straight run of liquid following the passing through of the flow straightener.

In an embodiment, the amount of vanes 101 and 102 may be at least six vanes, three along the upper half of the conical-shaped portion 103 and three along the lower half of the conical-shaped portion 103. Vane 102 is labeled separately because vane 102 may comprise an attachment mechanism (e.g., a nut) to be used when sealing the fluid conveyance device after installation of the flow straightener. In an embodiment, there may be one or more vanes with an attachment mechanism. The attachment mechanism may imperatively couple the flow straightener in a conveyance device at one or more locations. Though 102 may comprise an attachment mechanism, vane 102 may be included when determining the amount of vanes 101 and 102 necessary in a system 100. In an embodiment, additional vanes 101 may be operatively coupled in a system. The amount of vanes 101 and 102 in a system may be of an even number, thus an equal amount of vanes may be operatively coupled to conical-shaped portion 103 per upper half and lower half.

In an embodiment, the amount of vanes 101 and 102 located in the upper half with respect to the horizontal centerline and the lower half with respect to the horizontal centerline, operatively coupled to the conical shaped portion 103, may be equidistant from one another. For example, the three upper half vanes 101 and 102 comprise 30 degrees of separation between them; the same goes for the lower half vanes 101. In an embodiment, the position of a vane 101 or 102 in relation to the vane 101 or 102 adjacent, per upper and lower half, may create a triangular-shaped gap between them. This triangular-shape between adjacent vanes 101 and 102 may account for the round shape of a fluid conveyance device 105 for easy installation. Using, for example, three vanes 101 and 102 per half and having the vanes positioned 30 degrees apart may permit a system to reach maximum efficiency; thus, straightening out the swirl of the liquid traveling through the fluid conveyance device and decreasing turbulence. In an embodiment, additional vanes 101 may be implemented into a system. As mentioned previously, an even and symmetrical amount of vanes may be necessary in producing an efficient flow straightener. In an embodiment, where additional vanes are present, the position of each vane 101 may be equidistant, and the angle between each vane 101 may stay consistent throughout the upper and lower halves. In an embodiment, the vanes 101 and 102 may be located in positions on the conical-shaped portion 103 such that two vanes on opposite sides of the conical shaped portion 103 are located in a straight line and intersect at the longitudinal center axis. In other words, the vanes 101 and 102 present in the upper half of a system 100 may align with the lower half vanes 101 through the center of the conical-shaped portion 103. This symmetry may permit a system to work at maximum efficiency.

Referring to FIG. 2-FIG. 7, the installation process may be illustrated for a thorough understanding of how a flow straightener may be fitted into a fluid conveyance device. Other installation techniques may be used based upon different flow straightener configurations and applications. For ease of readability, an illustrative installation process will be discussed. Prior to describing the installation process, it will be important to understand the shape of the vanes.

Figure 5:
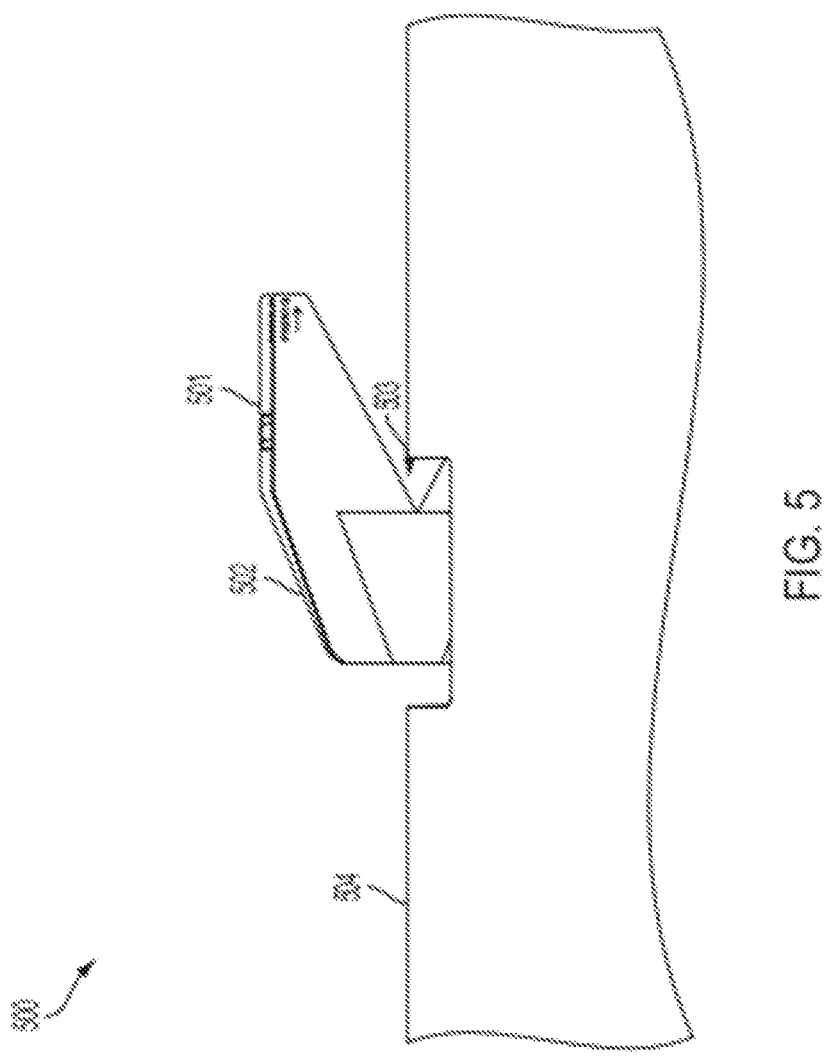
FIG. 5 illustrates an example of a side view of the second step for installing a flow straightener into a fluid conveyance device.

Referring to FIG. 5, the illustration depicts a side view of a partially installed flow straightener. The lower half of the flow straightener, with respect to the horizontal centerline, is inserted nearly all the way into a fluid conveyance device 504, while the upper half of the flow straightener is still outside of the fluid conveyance device 504. A side view of the vanes associated with the upper half of the flow straightener is present in the illustration. For the sake of explanation, the shape of a vane present in the upper half of the flow straightener will further be explained, however it is important to understand that all the vanes present in a flow straightener follow this same shape description, even the vanes present in the lower half of the flow straightener. A vane in system 500 may comprise a shape containing a leading tapered edge 502, a flat trailing edge 501, and an angle associated with where a vane may be operatively coupled to a conical-shaped portion 503. A vane consists of such a shape to allow for the installation of a flow straightener into an opening that may be smaller than the footprint of the flow straightener itself. The flat trailing edge 501 of the vane may touch the inside surface of the fluid conveyance device 504. The flat trailing edge 501 may assist in directing swirling liquid traveling through a fluid conveyance device 504 down into the conical-shaped portion of the flow straightener; as well as may break up liquid flows with strong turbulence. Flat trailing edges associated with each vane in a system may act as an anchoring piece inside the fluid conveyance device 504.

The leading tapered edge 502 may allow a flow straightener to be positioned at such an angle that the flow straightener may be further inserted into a fluid conveyance device. As a flow straightener is maneuvered through an opening in a fluid conveyance device 504, the leading tapered edge 501 may provide enough clearance to completely input the flow straightener into the fluid conveyance device 504. Similarly, the angle of the vane associated with where the vane is operatively coupled to the conical-shaped portion of the flow straightener 503 may permit the inserting of the flow straightener into an opening smaller than the flow straightener. The angle 503 is measured from the center of the conical-shaped portion of the flow straightener to the edge of the vane on the trailing flat edge side 501. The angle 503 may act as a pivot point or fulcrum when installing the flow straightener into a fluid conveyance device 504.

Figure 2:
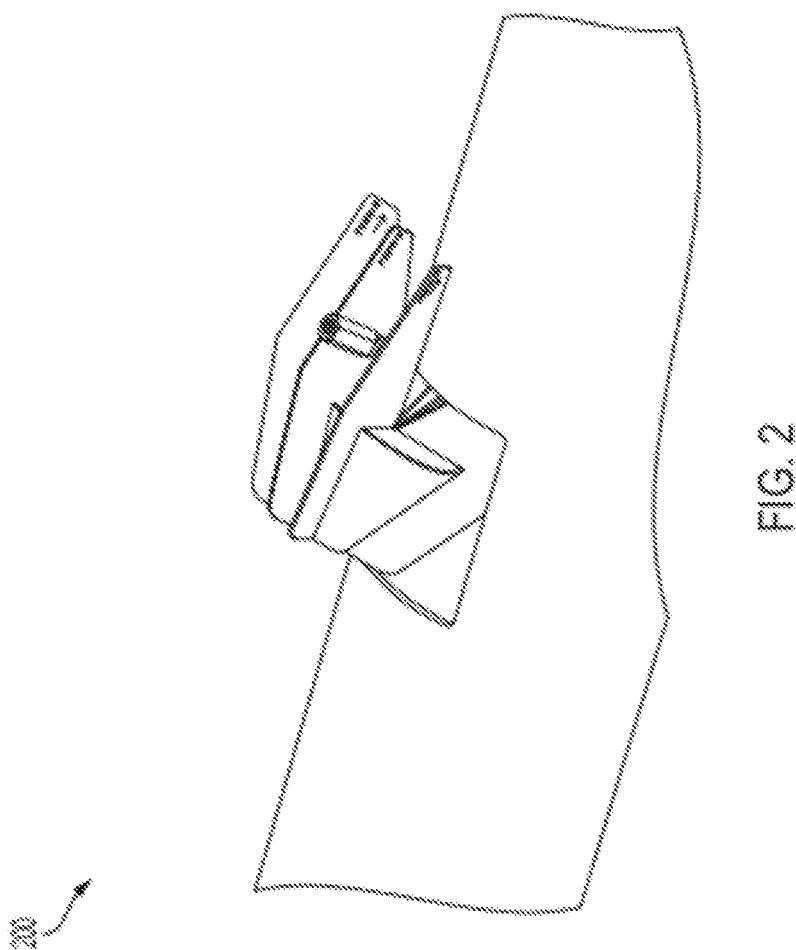
FIG. 2 illustrates an example of an overhead view of the first step for installing a flow straightener into a fluid conveyance device.
Figure 3:
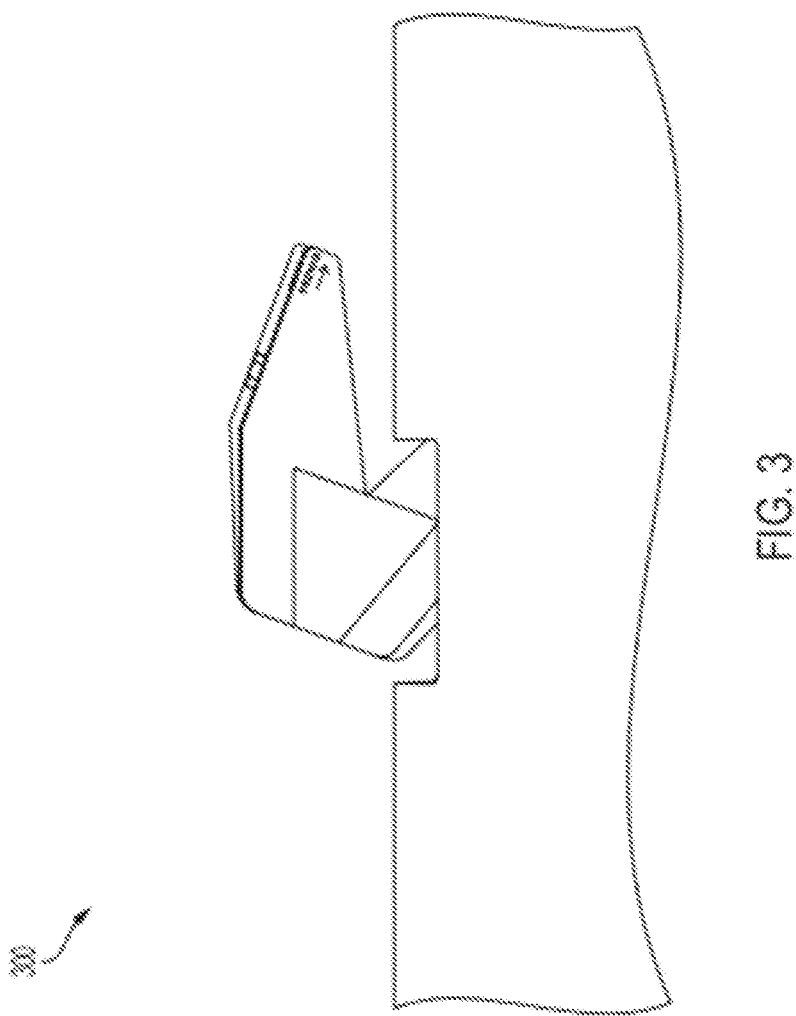
FIG. 3 illustrates an example of a side view of the first step for installing a flow straightener into a fluid conveyance device.

The installation process of the uniquely shaped flow straightener, described previously throughout, into a fluid conveyance device may overcome conventional methods as well as provide a new method for installation. Referring to FIG. 2 and FIG. 3, a flow straightener may be inserted into a fluid conveyance device with the lower half, with respect to the horizontal centerline, being inserted in first. As can be seen in both FIG. 2 and FIG. 3, the vanes operatively coupled to the conical-shaped portion of the flow straightener comprise a leading tapered edge, a flat trailing edge, and an angled vane measured from the center of the conical-shaped portion. The angled vane measured from the center of the conical-shaped portion allows the flow straightener to be inserted into an opening along the top of a fluid conveyance device at an angle. FIG. 2 may provide an overhead view of the first step of the installation process, showing how all of the lower half vanes associated with the flow straightener may be inserted at one time. In FIG. 3, a side view is provided of the first step of the installation process, showing that by inserting the lower half of the flow straightener into a system there may be enough space between the back of the flow straightener and the opening along the top of the fluid conveyance device to continue to maneuver the straightener into the fluid conveyance device.

Figure 4:
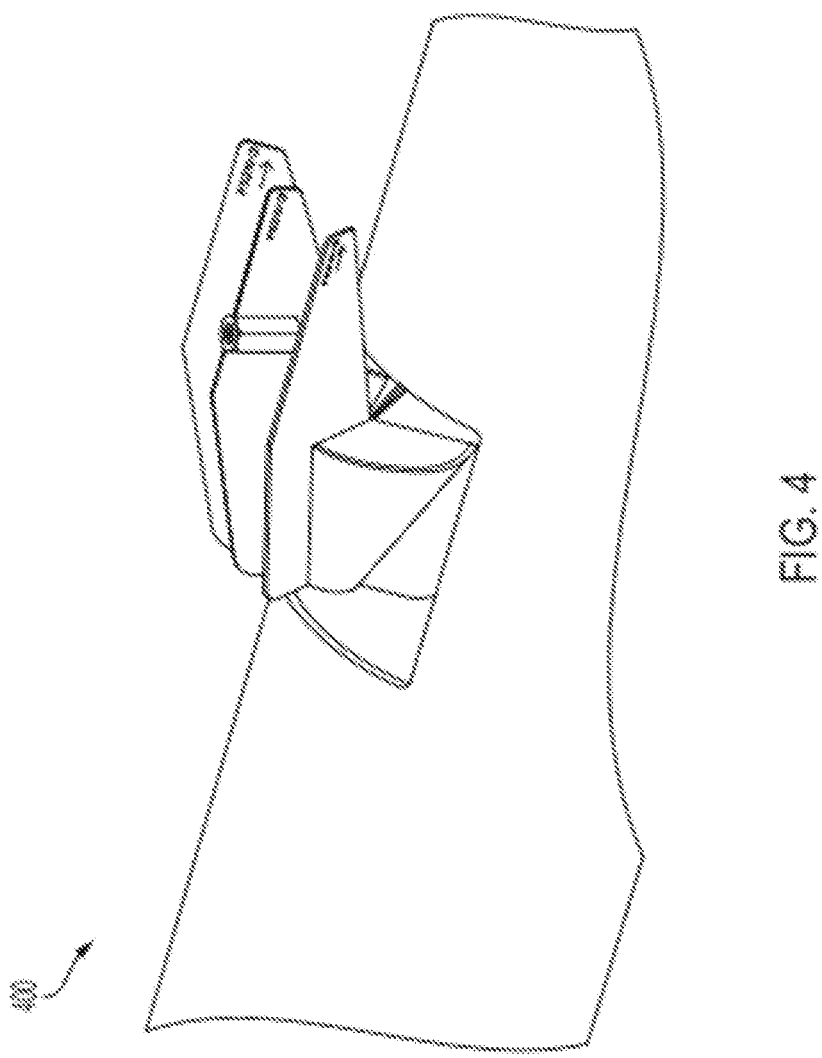
FIG. 4 illustrates an example of an overhead view of the second step for installing a flow straightener into a fluid conveyance device.

Referring now to FIG. 4 and FIG. 5, the next step of the installation process may be to square up the flow straightener with the fluid conveyance device. To square up the flow straightener with the device, an installer may take account of where the center of the conical-shaped portion is located (the center of the entire straightener), and may line the center up with the edge of the opening of the fluid conveyance device. As seen from the overhead view in FIG. 4, there is space surrounding the flow straightener that may be used for maneuvering the straightener. As seen from the side view in FIG. 5, an installer may line up the center of flow straightener with the edge of the opening in the fluid conveyance device. An installer may then move the flow straighter as close as possible to the edge of the opening of the fluid conveyance device. The side of the flow straightener comprising the vanes containing the angle measured from the center of the conical-shaped portion may be moved closest to the edge of the opening which may allow for more space between the opposite edge of the opening of the fluid conveyance and the side of the flow straightener comprising the smaller end of the conical-shaped portion. The center of the wider side of the conical-shaped portion (moved closest to the edge) may then act as a pivot point, or fulcrum, allowing the inserting of upper half of the flow straightener into the fluid conveyance device.

Figure 6:
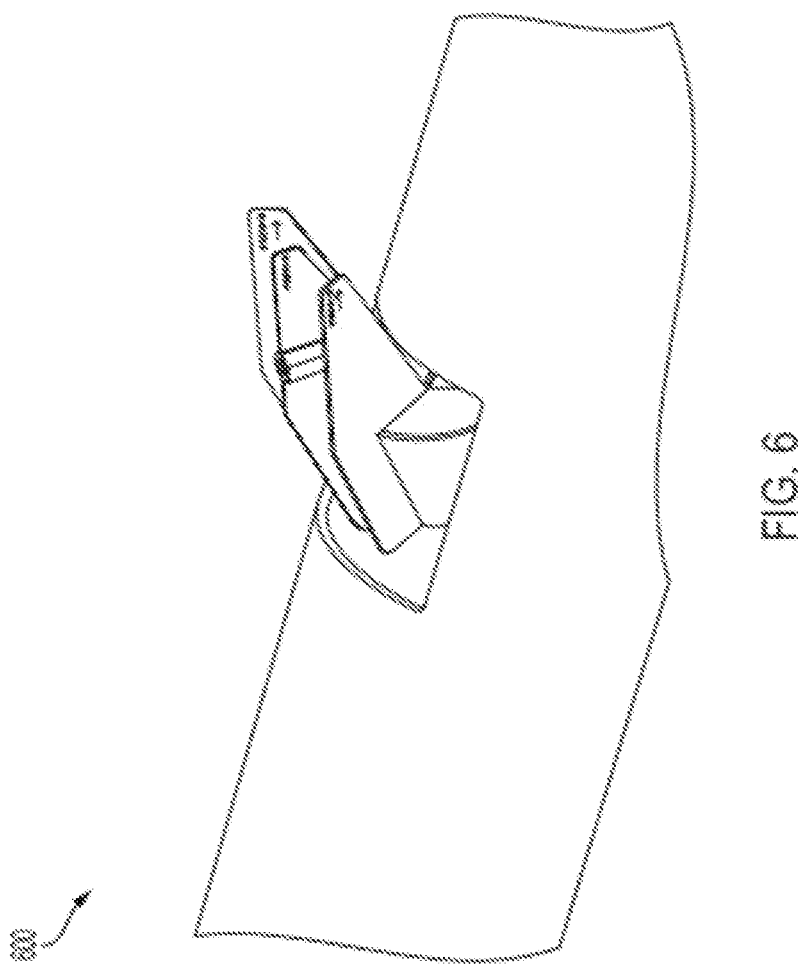
FIG. 6 illustrates an example of an overhead view of the third step for installing a flow straightener into a fluid conveyance device.
Figure 7:
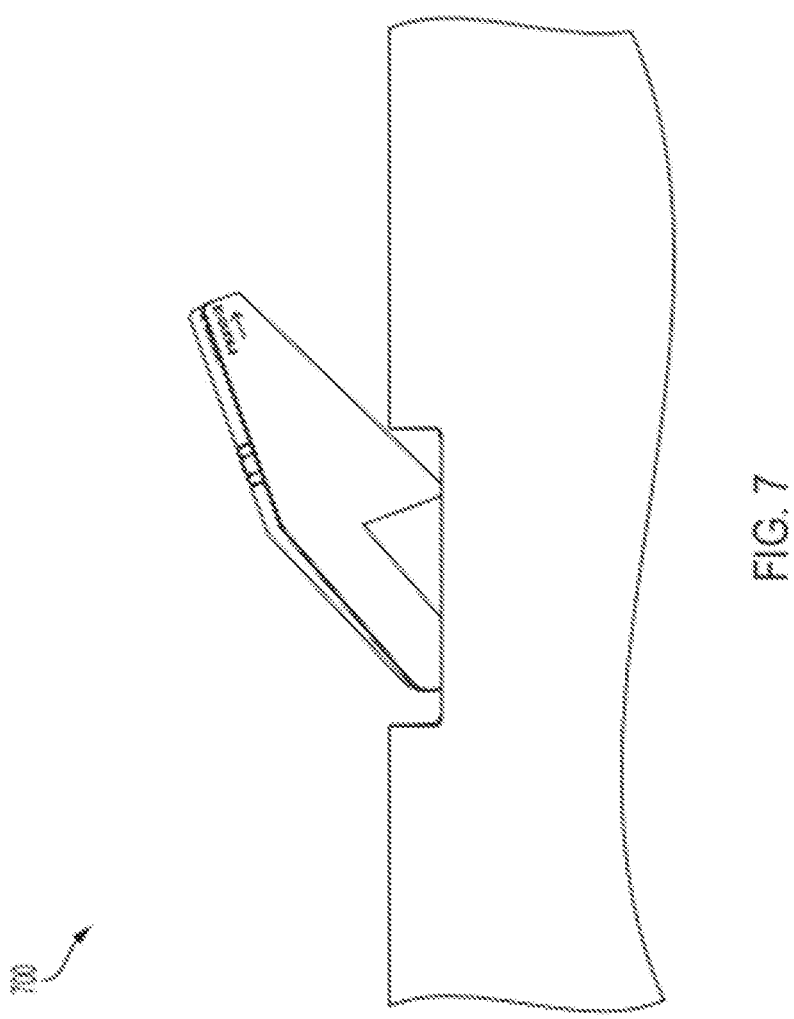
FIG. 7 illustrates an example of a side view of the third step for installing a flow straightener into a fluid conveyance device.

As can be seen in FIG. 6 and FIG. 7, the flow straightener is then pivoted downward, at the fulcrum, into the fluid conveyance device. The leading tapered edge allows for clearance of the flow straightener as it is being inserted into the fluid conveyance device at an angle. FIG. 6 shows an overhead view of the majority inserted flow straightener into the fluid conveyance device. There may be plenty of space for the flow straightener to continue to be maneuvered for installation. As for FIG. 7, the side view of the majority inserted flow straightener into the fluid conveyance device shows the space between the edge of the opening along the top of the fluid conveyance device and the leading tapered edge of the flow straightener. This space between the edge of the opening and the tapered edge of the flow straightener may permit the complete installation of the flow straightener into the fluid conveyance device.

The flow straightener may then be maneuvered into the fluid conveyance device by sliding the leading tapered edge into the fluid conveyance device, gradually rotating the flow straightener until the flat trialing edge of each vane touches the inside walls of the fluid conveyance device. This step is the origin of the terms leading tapered edge and trailing flat edge because the tapered edge may be inserted into the fluid conveyance device first, and then followed by the flat edge. After installation, the flow straightener comprising a plurality of vanes may be position so that at least one of the vanes for each upper and lower half of the flow straightener are substantially vertical. At least one of the vanes per half being vertical may be necessary when closing the opening of the fluid conveyance device. The flow straightener may need to be pulled forward after being completely inserted into the fluid conveyance device to allow for proper installation of a cover to close the opening in the top of the fluid conveyance device.

The opening created to insert the flow straightener device into the fluid conveyance device may be covered to avoid leakage. In an embodiment, the material used to cover the opening may be the same piece of the fluid conveyance device that was removed initially. In an embodiment, the material used to cover the opening may be a larger piece of material comprising a seal and may comprise a location for an attachment mechanism to be utilized. For example, as mentioned previously, a vane may comprise an attachment mechanism, in this case a nut. A cover for the fluid conveyance device opening may comprise, for example, a hole that may align with the nut contained in the vane of the flow straightener, and using an O-ring to create a seal around the hole in the cover, a screw may be inserted through the O-ring, then the hole in the cover, and into the nut contained in the vane of the flow straightener. In an embodiment, an attachment mechanism may be utilized to assure a flow straightener is anchored down or will not move while liquid flows through the straightener. Along with each additional vanes of the flow straightener touching the inside walls of the fluid conveyance device and acting as anchors, the use of an attachment mechanism may provide additional anchoring strength within the flow straightener.

Additionally, the material used for the flow straightener and the cover for the opening of the fluid conveyance device is dependent on the liquid flowing through the fluid conveyance device. A flow straightener may consist of a rigid material to assure that the flow straightener can withstand the pressure and turbulence associated with the liquid flowing through the fluid conveyance device. For example, a flow straightener may be made from stainless steel because it is a strong, rigid material that can withstand high amounts of pressure. A flow straightener and a cover may also take into account the chemical reaction between the materials used and the liquid flowing through the fluid conveyance device. A material may be used that will withstand the any chemical reaction between the material and liquid used to decrease the amount of servicing needed, for example, refurbishing or replacing pieces of a system. Stainless steel, as an example, may be a good material to use since it has a strong corrosion resistance.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A flow straightener, comprising:
    a conical-shaped portion having a first end and a second end substantially opposite the first end, wherein the first end has a bigger diameter than the second end; and
    a plurality of liquid directing vanes extending from the conical-shaped portion, wherein each of the plurality of liquid directing vanes are located at a different location on the conical-shaped portion and are oriented parallel to a longitudinal center axis of the conical-shaped portion; and
    wherein the plurality of liquid directing vanes extend from the conical-shaped portion such that the plurality of liquid directing vanes are located on either a first half or a second half with respect to the conical-shaped portion bisected by a plane running through end diameters of the conical-shaped portion parallel to the longitudinal center axis;
    wherein each of the plurality of liquid directing vanes are shaped having a tapered tail located after the first end of the conical-shaped portion, wherein the tapered tail of each of the plurality of liquid directing vanes creates a triangular-shaped gap between an inside edge of the plurality of liquid directing vanes and an inside edge of another of the plurality of liquid directing vanes.

2. The flow straightener of claim 1, wherein the plurality of liquid directing vanes are located at positions on the conical-shaped portion such that an outside edge of a corresponding vane does not extend past the perimeter of the conical-shaped portion.

3. The flow straightener of claim 1, wherein the plurality of liquid directing vanes comprises at least six vanes.

4. The flow straightener of claim 1, wherein the plurality of liquid directing vanes comprise an even number of liquid directing vanes and wherein half of the liquid directed vanes are located on the first half and wherein the other half of the liquid directed vanes are located on the second half.

5. The flow straightener of claim 4, wherein, for a half of the liquid directing vanes, each liquid directing vane is located at an angle from another of the liquid directing vanes, wherein the angle is the same for each of the vanes of the half.

6. The flow straightener of claim 1, wherein the plurality of liquid directing vanes are located in positions on the conical-shaped portion such that two vanes on opposite sides of the conical-shaped portion are parallel to a plane which intersects the longitudinal center axis.

7. The flow straightener of claim 1, wherein, when the flow straightener is installed in a fluid conveyance object, one of the plurality of liquid directing vanes located on the first half and an opposing liquid directing vane located on the second half are substantially vertical.

8. The flow straightener of claim 1, further comprising an attachment mechanism operatively coupled to at least one of the plurality of liquid directing vanes, wherein the attachment mechanism facilitates attachment of the flow straightener to a fluid conveyance object.

9. The flow straightener of claim 8, wherein the attachment mechanism comprises a nut.

10. A flow straightener system, comprising:
    a fluid conveyance device;
    a flow meter installed in the fluid conveyance device through an opening in the fluid conveyance device;

a conical-shaped portion of the flow straightener system located within the fluid-conveyance device;

the conical-shaped portion having a first end and a second end substantially opposite the first end, wherein the first end has a bigger diameter than the second end;

a plurality of liquid directing vanes extending from the conical-shaped portion, wherein each of the plurality of liquid directing vanes are located at a different location on the conical-shaped portion and are orientated parallel to a longitudinal center axis of the conical-shaped portion;

wherein the plurality of liquid directing vanes extend from the conical-shaped portion such that the plurality of liquid directing, vanes are located on either a first half or a second half with respect to the conical-shaped portion bisected by a plane running through end diameters of the conical-shaped portion parallel to the longitudinal axis; and wherein each of the plurality of liquid directing vanes are shaped having a tapered tail located after the first end of the conical-shaped portion, wherein the tapered tail of each of the plurality of liquid directing vanes creates a triangular-shaped gap between an inside edge of the plurality of liquid directing vanes and an inside edge of another of the plurality of liquid directing vanes.

11. The flow straightener system of claim 10, wherein the plurality of liquid directing vanes are located at positions on the conical-shaped portion such that an outside edge of a corresponding vane does not extend past the perimeter of the conical-shaped portion.

12. The flow straightener system of claim 10, wherein the plurality of liquid directing vanes comprises at least six vanes.

13. The flow straightener system of claim 10, wherein the plurality of liquid directing vanes comprise an even number of liquid directing vanes and wherein half of the liquid directed vanes are located on the first half and wherein the other half of the liquid directed vanes are located on the second half.

14. The flow straightener system of claim 13, wherein, for a half of the liquid directing vanes, each liquid directing vane is located at an angle from another of the liquid directing vanes, wherein the angle is the same for each of the vanes of the half.

15. The flow straightener system of claim 10, wherein the plurality of liquid directing vanes are located in positions on the conical-shaped portion such that two vanes on opposite sides of the conical-shaped portion are parallel to a plane which intersects the longitudinal center axis.

16. The flow straightener system of claim 10, wherein, when the flow straightener is installed in a fluid conveyance object, one of the plurality of liquid directing vanes located on the first half and an opposing liquid directing vane located on the second half are substantially vertical.

17. The flow straightener system of claim 10, further comprising an attachment mechanism operatively coupled to at least one of the plurality of liquid directing vanes, wherein the attachment mechanism facilitates attachment of the flow straightener to a fluid conveyance object.

18. A method for installing a flow straightener into a fluid conveyance device, comprising:

removing a portion of a fluid conveyance device to create an opening, wherein the portion is located on a first half of the fluid conveyance device, wherein the portion of the fluid conveyance device is smaller than the footprint of the flow straightener;

inserting at an angle and at a same time, through the opening of the fluid conveyance device, one or more second half vanes extending from the conical-shaped portion of the flow straightener, wherein each of the second half vanes are shaped having a tapered tail located after a first end of the conical-shaped portion, Wherein the tapered tail of each of the second half vanes creates a triangular-shaped gap between an inside edge of the second half vanes and an inside edge of another of the second half vanes;

aligning a center of the conical-shaped portion of the flow straightener with an edge of the opening in the fluid conveyance device, moving the center of the conical-shaped portion of die flow straightener close to the edge of the opening of the fluid conveyance device, a position at the end of the conical-shaped portion, centered on the conical-shaped portions longitudinal axis, moved close to the edge of the opening comprises a fulcrum;

rotating downward, at the fulcrum, the flow straightener comprising one or more leading tapered edges, wherein the one or more leading tapered edges provide clearance of the flow straightener from an opposite edge of the opening of the fluid conveyance device, wherein the opposite edge of the fluid conveyance device is away from the fulcrum of the flow straightener;

inserting at an angle and at the same time, through the opening of the fluid conveyance device, one or more first half vanes extended from the conical-shaped portion of the flow straightener;

rotating, as the one or more first half vanes are inserted into the fluid conveyance device, the flow straightener comprising one or more flat trailing edges, wherein the one or more flat trailing edges touch the inside of the fluid conveyance device, wherein the one or more flat trailing edges act as anchors along the inside of the fluid conveyance device;

adjusting the flow straightener inserted into the fluid conveyance device, wherein the adjusting comprises at least one first half vane and at least one second half vane are substantially vertical, wherein the adjusting comprises pulling the flow straightener forward within the fluid conveyance device to allow proper installation of a cover; and installing a cover over the opening in the fluid conveyance device.

\* \* \* \* \*